United States Patent [19]
Kindel et al.

[11] 3,753,584
[45] Aug. 21, 1973

[54] UNIVERSAL JOINT CONSTRUCTION WITH RELEASABLE PARTS

[75] Inventors: Georg Kindel, Lemforde, Hann; Jurgen Ulderup, Haldem, both of Germany

[73] Assignee: Lemforder Metallwaren AG, Lemforde/Hann, Germany

[22] Filed: Apr. 24, 1972

[21] Appl. No.: 246,811

[30] Foreign Application Priority Data
June 11, 1971 Germany.................. P 21 29 145.2

[52] U.S. Cl. .......................... 287/85 A, 287/90 R
[51] Int. Cl. ............................................ F16c 11/06
[58] Field of Search.................. 287/85 A, 87, 90 R, 287/90 C; 277/212 FB, 212 C, 212 R

[56] References Cited
UNITED STATES PATENTS
3,389,926   6/1968   Gottschald........................ 287/87
2,424,914   7/1947   Brown............................ 287/85 A

*Primary Examiner*—Andrew V. Kundrat
*Attorney*—John J. McGlew and Alfred E. Page

[57] ABSTRACT

A releasable universal joint construction includes a tubular housing with a socket member of resilient material disposed in the housing in resilient engagement therewith. The socket member has at least one open end defining a joint pin insertion opening with an annular projecting collar extending into the opening. The socket wall is of a thickness in the vicinity of the collar to permit the collar and the wall to be displaced inwardly in said housing upon insertion of the ball head of a joint pin to permit passage of the ball head beyond the collar. The collar then forms an inwardly projecting portion below the ball head when the ball head is seated on the spherical seat defined by the socket member.

6 Claims, 3 Drawing Figures

UNIVERSAL JOINT CONSTRUCTION WITH RELEASABLE PARTS

BACKGROUND OF THE INVENTION

1. Field of the Invention

This invention relates in general to the construction of universal joints, and in particular, to a new and useful universal joint including a socket member which comprises a resilient socket positioned within a tubular housing and which includes an annular collar portion at its ball pin member receiving end which flexes inwardly to permit entrance of the ball member and extends outwardly below the ball member to prevent its withdrawal after the ball member is seated.

2. Description of the Prior Art

The present invention deals particularly with a releasable ball joint for connecting linkage parts, particularly operating linkages of motor vehicles. For connecting linkage parts such as the operation connection for carburetors or other control devices in motor vehicles, ball joints or universal joints of a variety of constructions are known. Thus, there are used, for example, joints where the ball head of the joint pin is insertable into a socket of elastomeric material and is retained by special holding means uch as split rings, spring yokes, etc., against undesired release from the joint housing. The known holding means considerably increase the costs of production of such joints especially because their arrangement requires a special design of the housing with the resultant higher labor costs and it also requires particular assembly of the joint parts making the manufacture more expensive and more difficult. Joints are presently known where the ball head of the joint pin is mounted in the joint housing without the aid of any securing means and is retained against undesired release merely by the elastic plastic of the socket. This type of retention, however, requires a special design of the joint housing as well as a modification of the usual spherical form of the pin head which is then usually provided with a stem type attachment. The thickened end of the attachment traverses the joint housing on the side opposite the entrance opening and is retained against undesired release by suitable means. Such joints are very complicated in construction and their production is therefore costly in labor and money. In particular, they do not offer sufficient stability of the joint connection against relatively great tensile forces.

SUMMARY OF THE INVENTION

The invention provides a releasable ball joint construction which includes a ball receiving socket made of resilient material which engages around the ball head with sufficient tight elastic engagement to ensure that it will not release accidentally from the elastic joint, and the construction is inexpensive and simple. The construction includes a housing with an outer tubular relatively rigid part into which is positioned an elastic socket which has a ball member receiving opening which is bounded by an annular bead or collar which is flexed inwardly upon insertion of the ball and which moves outwardly to block removal of the ball after it is in place. The socket member is advantageously shaped so that it defines an outer groove with its exterior surface and the interior surface of the tubular housing in the vicinity of the collar so that the wall of the socket member may be flexed inwardly to permit entrance of the ball member. For this purpose, the socket member is preferably conically tapered toward the ball member receiving end so that it defines an annular groove with the interior wall of the receiving housing.

A universal joint or ball joint constructed in accordance with the invention has several advantages. The ball head of the joint pin can be easily pressed into the socket, but an undesired release of the joint pin particularly under relatively great tensile forces if reliably prevented without the need of any special retention means. This is achieved simply by the design of the elastic socket according to the invention which makes it possible for the joint housing to retain the usual simple form and without changing the spherical shape of the pin head of the joint pin. In this way, the production costs for such a joint can be reduced considerably.

Accordingly, it is an object of the invention to provide an improved socket construction for a universal joint which comprises an outer housing of tubular form and a socket member disposed in said outer housing having an interior at least partially spherical surface for operative engagement around the spherical surface of a ball pin and which includes a ball receiving opening at one end which is bounded by an inwardly extending collar formation which extends around at least a major part of the opening, and wherein the material of the socket may be flexed outwardly against the socket housing to admit the ball head but it defines a retention lift to prevent withdrawal thereof.

A further object of the invention is to provide a universal joint construction having a resilient socket housing of one piece with an opening bounded by an annular collar which prevents withdrawal of a ball pin mounted in the socket member.

A further object of the invention is to provide a universal joint which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there is illustrated a preferred embodiment of the invention.

GENERAL DESCRIPTION OF THE PREFERRED EMBODIMENT

Figure 1:
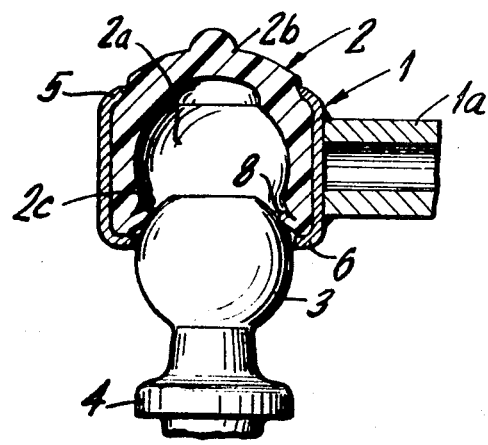
FIG. 1 is a transverse sectional view of a universal joint constructed in accordance with the invention showing the ball pin at the entrance into the socket.

Referring to the drawings in particular, the invention embodied therein, comprises a universal joint which includes a tubular member or joint housing 1, which is adapted to be carried on a linkage or other part 1a and which is of substantially cylindircal form. A resilient socket member, generally designated 2, is positioned within the housing in resilient contacting engagement therewith and it defines an interior cavity having a ball head engaging surface of generally spherical form 2a.

The socket member 2 icnludes a closed end 2b, and an opposite end 2c which defines a joint pin head insertion opening 2c into which a spherical head 3 of a joint pin 4 may be directed.

In accordance with the invention, the socket 2 is advantageously of an elastic material such as a plastic which is capable of permitting sliding and abrasion-resistant contact with the ball head 3, and a suitable type of plastic is a polyamide, polyurethane, acetals and other similar plastics.

The socket housing including the socket 2 and the housing 1 is of inexpensive construction and the resilient socket material of the socket 2 is held in position by crimped upper edges or flanges 5 of the tubular member 1 which are turned over a shoulder portion of the socket and by horizontally extending lower flanges or crimpd parts 6 which define a lower ledge on which the socket 2 is engaged.

Figure 2:
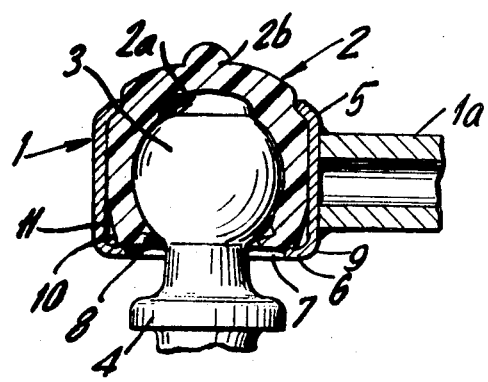
FIG. 2 is a section similar to FIG. 1 with the parts in an operative position.

In accordance with a feature of the construction, the socket member 2 is provided with an annular bead or collar 8 which extends inwardly into the opening 2c and which in the operating position shown in FIG. 2 and along the lower spherical part of the resilient socket 2, prevents withdrawal of the ball head 3. In the operating position shown in FIG. 2, an annular space 11 is defined between the exterior surface of the socket 2 and the interior wall 9 of the outer housing 1. The socket member 2 includes an exterior wall with a conically tapered portion 10 in the vicinity of the collar 8 which may be shifted outwardly against the wall of the housing 1 to permit insertion as indicated in FIG. 1 or withdrawal under large axial force on the pin 4, as indicated in FIG. 3.

Figure 3:
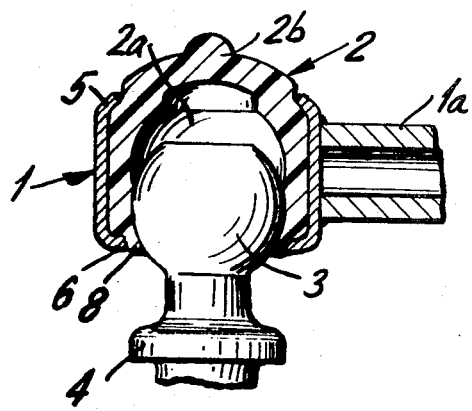
FIG. 3 in a view of the ball joints shown in FIG. 2 in a partly withdrawn position.

The mode of operation of the joint is evident from FIGS. 1 and 3. When the joint pin 4 is pushed into the socket 2, first the annular collar 8 is pressed backwardly causing it to yield into the annular space 11 so that the spherical head 3 of the joint pin 4 can be brought into its end position shown in FIG. 2 relatively easily. Once in position, an undesired release of the joint connection is prevented by the inwardly extending collar 8 which takes support against the lower edge 6 of the joint housing 1. The joint connection can be released only when applying a great tensile force on the joint pin 4 as shown in FIG. 3, because the collar 8 is located in the entrance opening and provides a clamping effect on the ball head when any attempt to withdraw is made. For this purpose, the passage opening 7 in the outer housing 1 is made larger than the larger circumference of the ball head so that exit of the joint pin from the socket may be effected by exerting pressure on the lower edge of the resilient socket member 2 to cause the conical portion 10 to move outwardly into the annular space 11.

By corresponding dimensioning of the pin passage opening of the joint housing in relation to the ball diameter and in relation to the thickness of the collar 8, it is possible to adapt the entrance and/or exit of the socket 2 in a favorable manner to withstand the occurring stresses which might tend to disengage the parts during operation. In this way, easy installation of the joint pin and a joint connection may be accomplished and the joint pin construction is secure in its operating position without any particular securing elements.

While a specific embodiment of the invention has been shown and described in detail to illustrate the application of the principles of the invention, it will be understood that the invention may be embodied otherwise without departing from such principles.

What is claimed is:

1. A releasable universal joint construction comprising a tubular housing, a socket member of resilient material resiliently engaged in said housing and having at least one open end defining a joint pin head insertion opening, the interior of said socket member defining a ball engagement surface of generally spherical form, said socket member having an integral annular radially projecting collar portion defined by an annular groove in said socket member contiguous with the end of said ball engagement surface so as to be separate from said engagement surface and surround the joint pin insertion opening and being of a wall thickness in the vicinity of said collar to permit the collar and the wall to be displaced inwardly in said housing, and a joint pin having a generally spherical ball head of a diameter larger than the insertion opening of said socket member and engaged on the ball engagement surface thereof within said socket member, said collar being deflectable in the insertion direction upon insertion of a ball head extending radially inwardly below said ball head when the ball is in a fully engaged position on the ball engagement surface of said socket member.

2. A releasable universal joint construction comprising a tubular housing, a socket member of resilient material resiliently engaged in said housing and having at least one open end defining ajoint pin head insertion opening, the interior of said socket member defining a ball engagement surface of generally spherical form, said socket member having an annular projecting collar portion surrounding the joint pin insertion opening and being of a wall thickness in the vicintiy of said collar to permit the collar and the wall to be displaced inwardly in said housing, and a joint pin having a generally spherical ball head of a diameter larger than the insertion opening of said socket member and engaged on the ball engagement surface thereof within said socket member, said collar being deflectable in the insertion direction upon insertion of a ball head and extending radially inwardly below said ball head when the ball is in a fully engaged position on the ball engagement surface of said socket member, said socket member having a terminal end spaced inwardly from said tubular housing adjacent the insertion opening end to define an annular space between said socket member and said housing to accommodate expansion of the socket member at such location upon insertion and removal of a ball head therefrom.

3. A releasable universal joint construction, according to claim 2, wherein said socket member has an exterior conically tapered wall tapered inwardly toward the ball receiving opening, said tubular housing including an inturned flange portion located directly beneath said collar and bounding an opening which is larger than the largest dimension of said ball head.

4. A releasable universal joint construction, according to claim 2, wherein said tubular housing includes an end adjacent the ball receiving opening with a substantially horizontally extending flange bounding an opening below the socket member opening for the receipt of a ball head, said collar projecting inwardly into the opening directly above the flange, said socket member being spaced inwardly from the interior wall of said housing adjacent said collar portion.

5. A releasable universal joint construction, according to claim 4, wherein said resilient socket member includes a closed end forming a cover.

6. A socket housing construction for a releasable universal joint, comprising an outer tubular housing portion, a socket member of resilient material resiliently engaged within said housing and having at least one open end defining a joint ball head insertion opening, said housing having an inturned portion surrounding the insertion opening, the interior of said socket member defining a ball engagement surface of generally spherical form and the exterior of said socket member being spaced inwardly from the interior wall of said housing adjacent the ball head receiving opening and having an inwardly extending collar bounding the ball head receiving opening and supported on the inturned portion of said housing.

* * * * *